US012654504B2

(12) United States Patent
Yasuda et al.

(10) Patent No.: US 12,654,504 B2
(45) Date of Patent: Jun. 16, 2026

(54) SYSTEM AND METHOD FOR ADJUSTING THE PITCH OF A VEHICLE TO IMPROVE VISIBILITY

(71) Applicant: Toyota Research Institute, Inc., Los Altos, CA (US)

(72) Inventors: Hiroshi Yasuda, San Carlos, CA (US); Andrea Michelle Rios Lazcano, Brussels (BE)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 65 days.

(21) Appl. No.: 18/673,817

(22) Filed: May 24, 2024

(65) Prior Publication Data

US 2025/0360767 A1      Nov. 27, 2025

(51) Int. Cl.
*B60G 17/016*        (2006.01)
*G06V 20/59*         (2022.01)

(52) U.S. Cl.
CPC ......... *B60G 17/016* (2013.01); *G06V 20/597* (2022.01); *B60G 2400/823* (2013.01); *B60G 2500/30* (2013.01)

(58) Field of Classification Search
CPC ............ B60G 17/016; B60G 2400/823; B60G 2500/30; G06V 20/597
See application file for complete search history.

(56) References Cited

U.S. PATENT DOCUMENTS

| | | | |
|---|---|---|---|
| 9,132,712 B2 | 9/2015 | Kasuga et al. | |
| 9,566,842 B2 | 2/2017 | Lee | |
| 10,308,090 B2 | 6/2019 | Stolle | |
| 10,603,973 B2 | 3/2020 | Kasuya et al. | |
| 11,124,035 B1 * | 9/2021 | Hall .................... | B60G 17/0157 |
| 11,285,773 B1 * | 3/2022 | Hall ........................ | B60G 17/06 |
| 11,407,269 B2 | 8/2022 | Guest et al. | |
| 11,654,799 B2 | 5/2023 | Haller | |
| 2012/0053794 A1 | 3/2012 | Alcazar et al. | |
| 2019/0001782 A1 | 1/2019 | Anderson et al. | |
| 2023/0093748 A1 * | 3/2023 | Kim .................... | B60G 17/0195 701/37 |
| 2023/0244834 A1 * | 8/2023 | Kwon ..................... | G06F 30/20 703/8 |
| 2024/0067254 A1 * | 2/2024 | Weston ................. | B62D 1/046 |

FOREIGN PATENT DOCUMENTS

| | | | | |
|---|---|---|---|---|
| JP | 2006069395 A | 3/2006 | | |
| JP | 2008034773 A | 2/2008 | | |
| JP | 2008201347 A | 9/2008 | | |
| JP | 2009176295 A | 8/2009 | | |
| KR | 100993003 B1 | 11/2010 | | |
| WO | WO-2023106165 A1 * | 6/2023 | ........... | B60G 17/015 |
| WO | WO-2023214023 A1 * | 11/2023 | ............. | B60G 17/02 |

* cited by examiner

*Primary Examiner* — Joseph J Dallo

(74) *Attorney, Agent, or Firm* — Christopher G. Darrow; Darrow Mustafa PC

(57) ABSTRACT

The systems and methods for adjusting the pitch of a vehicle to improve visibility are described herein. In one example, a system includes a processor and a memory in communication with the processor. The memory includes instructions that, when executed by the processor, cause the processor to determine a physical characteristic of an occupant of a vehicle and control a vehicle suspension system to adjust the pitch of the vehicle based on the physical characteristic. By so doing, the visibility of the occupant can be improved.

17 Claims, 6 Drawing Sheets

SYSTEM AND METHOD FOR ADJUSTING THE PITCH OF A VEHICLE TO IMPROVE VISIBILITY

TECHNICAL FIELD

The subject matter described herein relates, in general, to systems and methods for improving visibility for occupants, especially drivers, of vehicles.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Vehicles have windshields that allow occupants, such as drivers, to perceive the environment in front of the vehicle. However, in some cases, the field of view of the driver may be limited based on one or more physical characteristics of the driver, such as the height of the driver, the seating position of the driver, etc., and the viewable area provided by the windshield. For example, referring to FIGS. 1A and 1B, illustrated is a vehicle 10 operated by two different drivers-driver 12A and driver 12B. In this example, driver 12A has a different field of view 14A through the front windshield 16 than that of the driver 12B. The difference between the field of views 14A and 14B can be explained due to the different heights of the drivers 12A and 12B. Moreover, the driver 12B is taller than that of the driver 12A, and therefore, the location of the heads 18A and 18B and/or eyes 20A and 20B of the drivers 12A and 12B, respectively, may differ, resulting in in different fields of view.

While the physical differences, such as the heights of the drivers 12A and 12B, may be fairly small, the impact these differences have on the field of views 14A and 14B may be significant. Moreover, the driver 12A can see elevated objects, such as traffic lights, more easily than that of the driver 12B. Conversely, the driver 12B can see lower objects, such as small animals, more easily than that of the driver 12A.

SUMMARY

This section generally summarizes the disclosure and is not a comprehensive explanation of its full scope or all its features.

In one embodiment, a system for improving the visibility of an occupant of a vehicle includes a processor and a memory in communication with the processor. The memory includes instructions that, when executed by the processor, cause the processor to determine a physical characteristic of the occupant of the vehicle and control a vehicle suspension system to adjust the pitch of the vehicle based on the physical characteristic.

In another embodiment, a method for improving the visibility of an occupant of a vehicle includes the steps of determining a physical characteristic of an occupant of a vehicle of an occupant of the vehicle and controlling a vehicle suspension system to adjust the pitch of the vehicle based on the physical characteristic.

In yet another embodiment, a non-transitory computer-readable medium includes instructions that, when executed by a processor, cause the processor to determine a physical characteristic of an occupant of a vehicle and control a vehicle suspension system to adjust a pitch of the vehicle based on the physical characteristic.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1A:
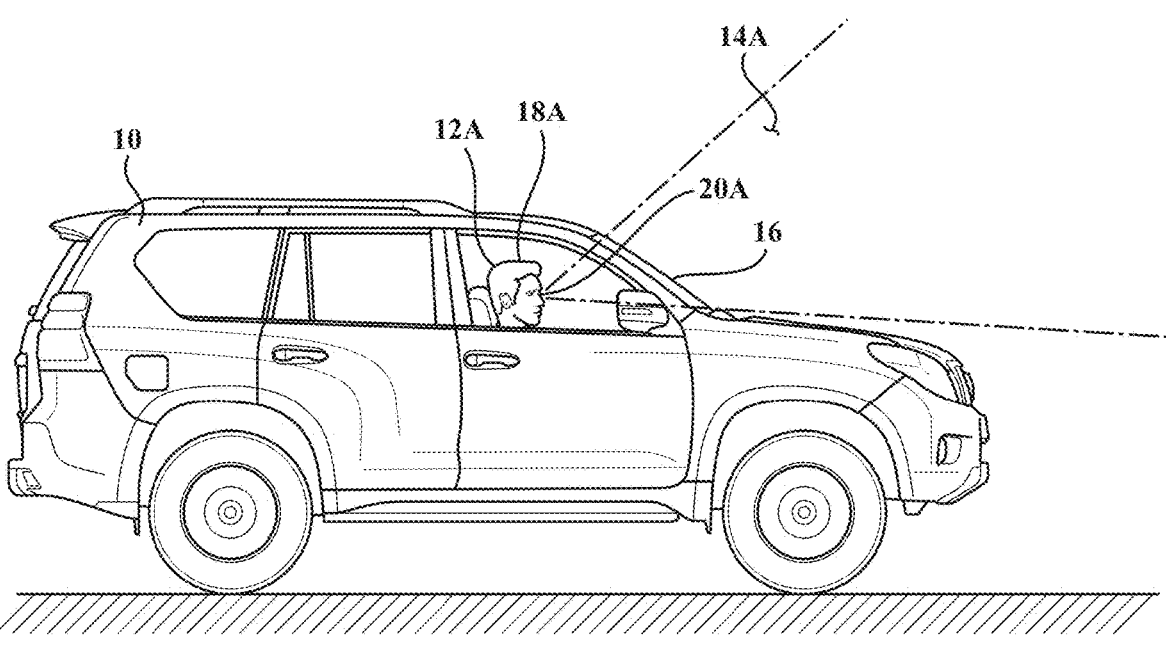
FIGS. 1A and 1B illustrate variations in the fields of view of different drivers having different physical characteristics when operating the same vehicle.
Figure 1B:
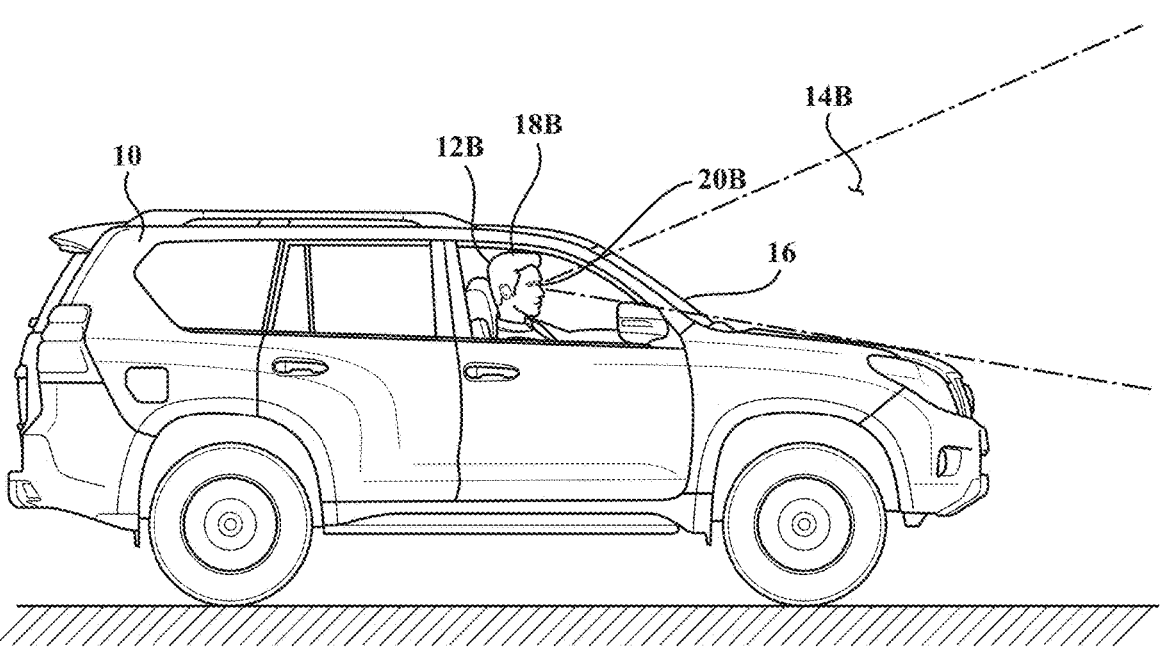

Described are systems and methods for adjusting the pitch of a vehicle based on one or more physical characteristics of an occupant, such as the driver, to improve visibility. Moreover, as described in the background section and illustrated in FIGS. 1A and 2B, the physical characteristics of a driver may impact their visibility of the environment. For example, if the driver is seated lower within the vehicle, such as may be the case for the shorter driver, the driver may have improved visibility regarding elevated objects but will have reduced visibility of lower objects. The converse is also true, wherein a driver seated higher within the vehicle, such as in the case of a taller driver, may have improved visibility of lower objects but reduced visibility of elevated objects.

The systems and methods described herein take into account the physical characteristics of the driver and adjust the pitch of the vehicle so as to raise and/or lower the front and/or rear ends of the vehicle to improve visibility. Typically, this is accomplished by controlling the suspension system of the vehicle to change the overall pitch of the vehicle to improve visibility.

Figure 2A:
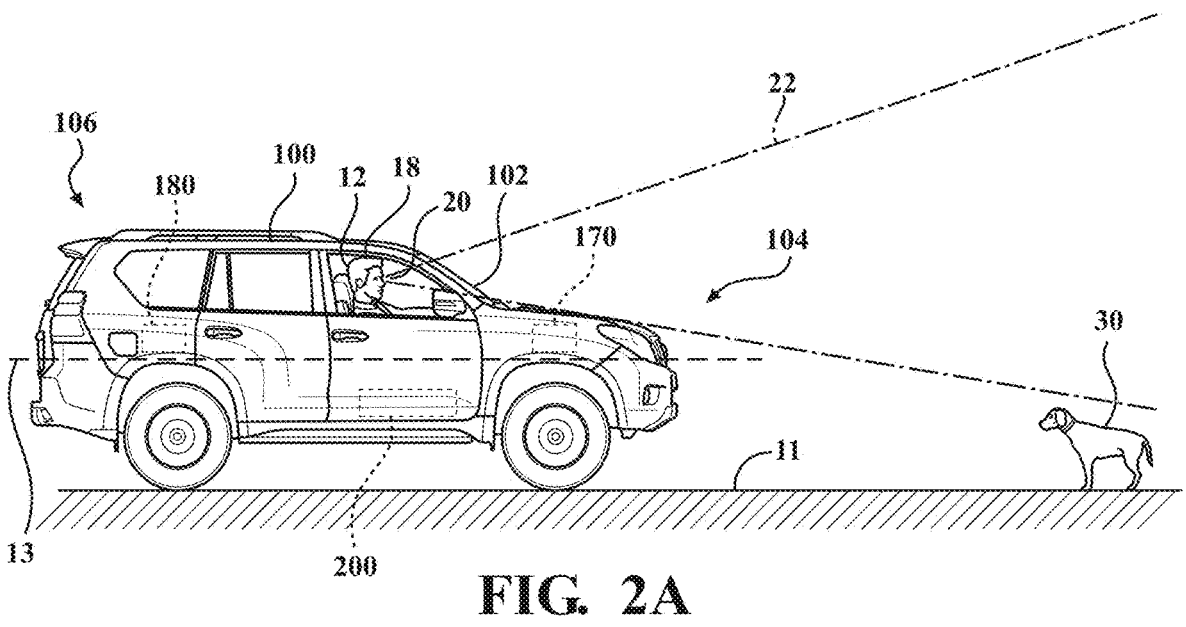
FIGS. 2A and 2B illustrate a scenario wherein a vehicle pitch adjustment system improves the visibility of a low object by adjusting the pitch of the vehicle based on a physical characteristic of the driver of the vehicle.

For example, referring to FIG. 2A, illustrated is a vehicle 100 having an occupant located within. In this example, the occupant is a driver 12 of the vehicle 100. As explained previously, the head position of the head 18 of the driver 12 and/or the eye position of the eyes 20 of the driver 12 may impact the field of view 22 through the forward-looking windshield 102 of the vehicle 100.

In addition, the vehicle 100 also includes a vehicle pitch adjustment system 200 for adjusting the pitch 13 of the vehicle 100. As will be explained in greater detail later, the vehicle pitch adjustment system 200 can control the suspension system of the vehicle 100, such as the front suspension 170 and/or the rear suspension 180 of the vehicle 100, to take into account one or more physical characteristics of the driver 12, such as the height of the driver 12, a seating position of the driver 12, a driver facial position when the driver 12 is seated within the vehicle 100, and/or the field of view 26 of the driver when the driver 12 is seated within vehicle 100. Using these physical characteristics, the vehicle pitch adjustment system 200 can change the pitch 13 of the vehicle 100 to improve the overall visibility of the driver 12. The pitch 13 is the rotation of the vehicle 100 about a transverse axis of the vehicle 100. Moreover, the pitch 13 can be adjusted by essentially raising and/or lowering the front end 104 and/or the rear end 106 of the vehicle 100. Additionally, as will be explained later, the location of an object forward of the vehicle 100 may also be utilized by the pitch adjustment system 200 when considering how much to change the pitch 13 of the vehicle 100.

Figure 2B:
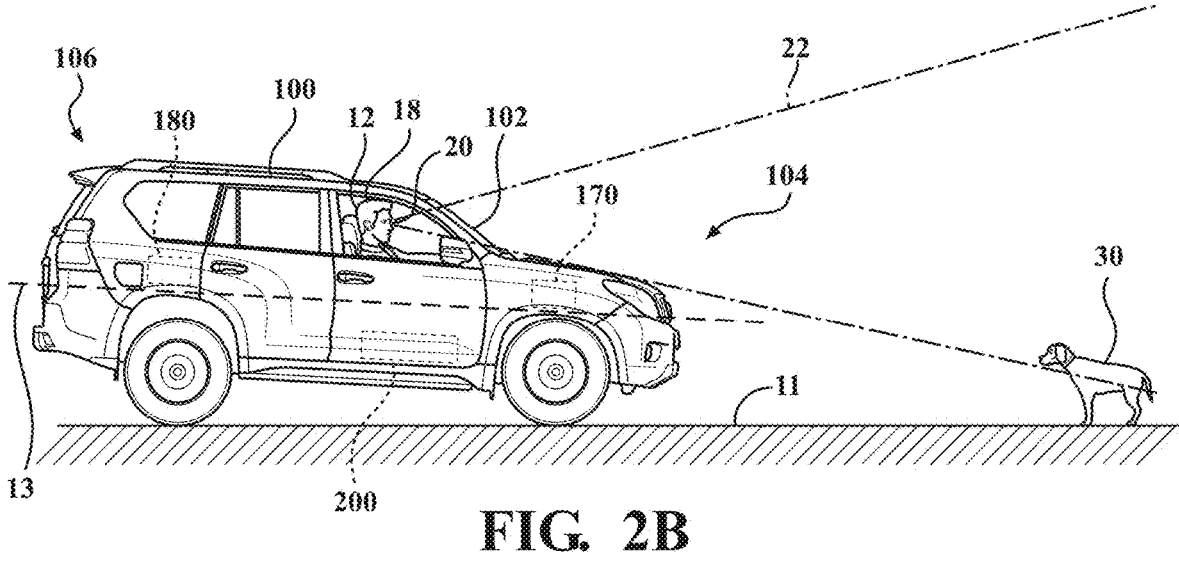

In this example, FIG. 2A illustrates a situation where the pitch 13 of the vehicle 100 is not adjusted. Because the pitch 13 of the vehicle 100 is not adjusted to improve visibility, the object 30 is outside the field of view 22 of the driver 12. The situation illustrated in FIG. 2A may occur if the driver 12 is generally shorter and/or seated in a lower seating position. However, as shown in FIG. 2B, the vehicle pitch adjustment system 200 has taken into account the physical characteristics of the driver 12 to improve the visibility of the object 30 to the driver 12. Moreover, the pitch adjustment system 200 has essentially lowered the front end 104 of the vehicle 100 and raised the rear end 106 of the vehicle 100 so that the field of view 22 of the driver 12 now includes the object 30.

Figure 3A:
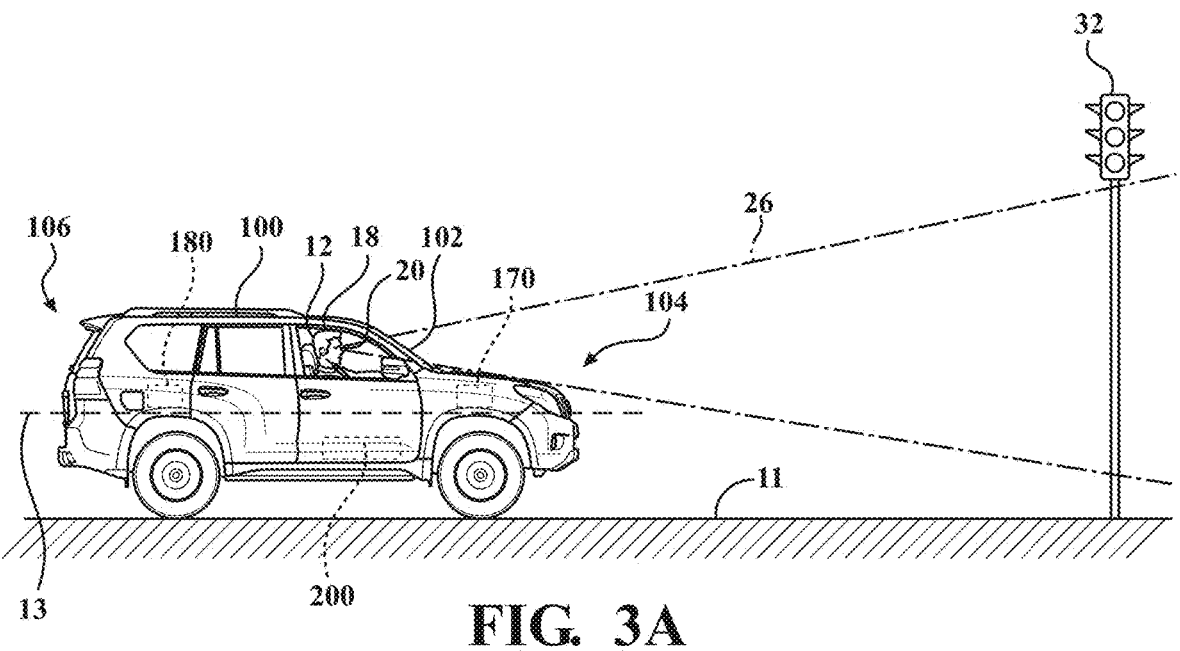
FIGS. 3A and 3B illustrate a scenario wherein a vehicle pitch adjustment system improves the visibility of an elevated object by adjusting the pitch of the vehicle based on a physical characteristic of the driver of the vehicle.
Figure 3B:
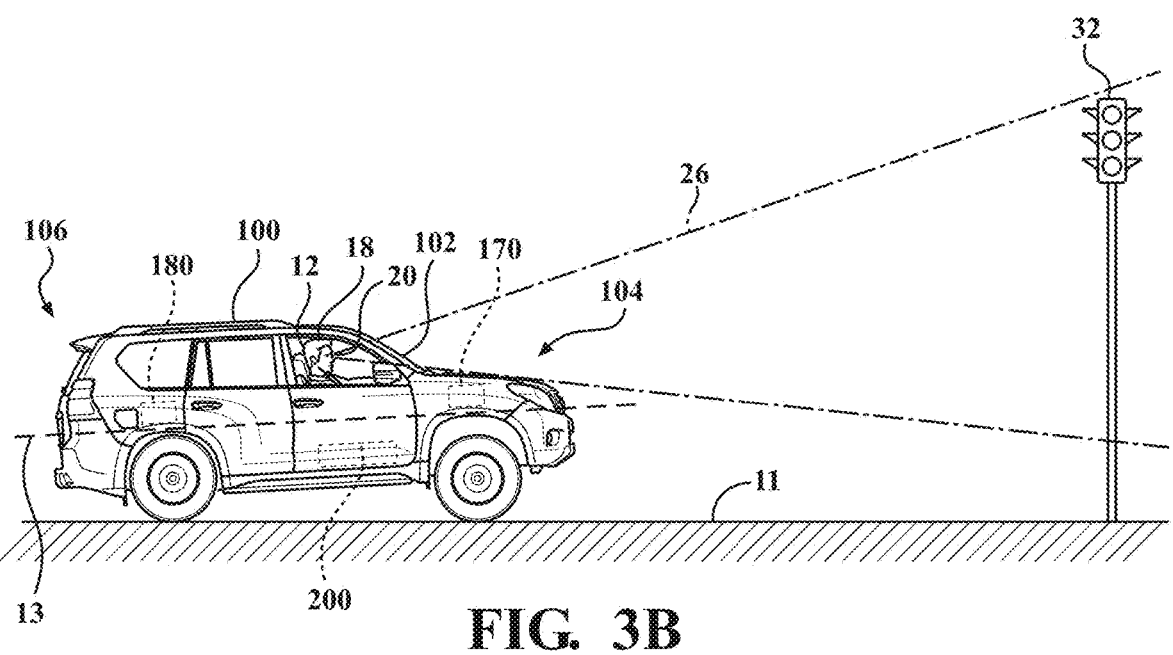

The object 30 in the example shown in FIGS. 2A-2B was generally a lower object, such that the object was closer to the ground 11. However, it should be understood that the vehicle pitch adjustment system 200 can also be used to improve the visibility of elevated objects. For example, FIGS. 3A-3B illustrate an example wherein the driver 12 has a field of view 26. As shown in FIG. 3A, the field of view 26 of the driver 12 does not include the elevated object 32. However, by considering the physical characteristics of the driver 12, the vehicle pitch adjustment system 200 can raise the front end 104 of the vehicle 100 and lower the rear end 106 of the vehicle 100 such that the field of view 26 of the driver 12 can include the elevated object 32, as best shown in FIG. 3B.

Figure 4:
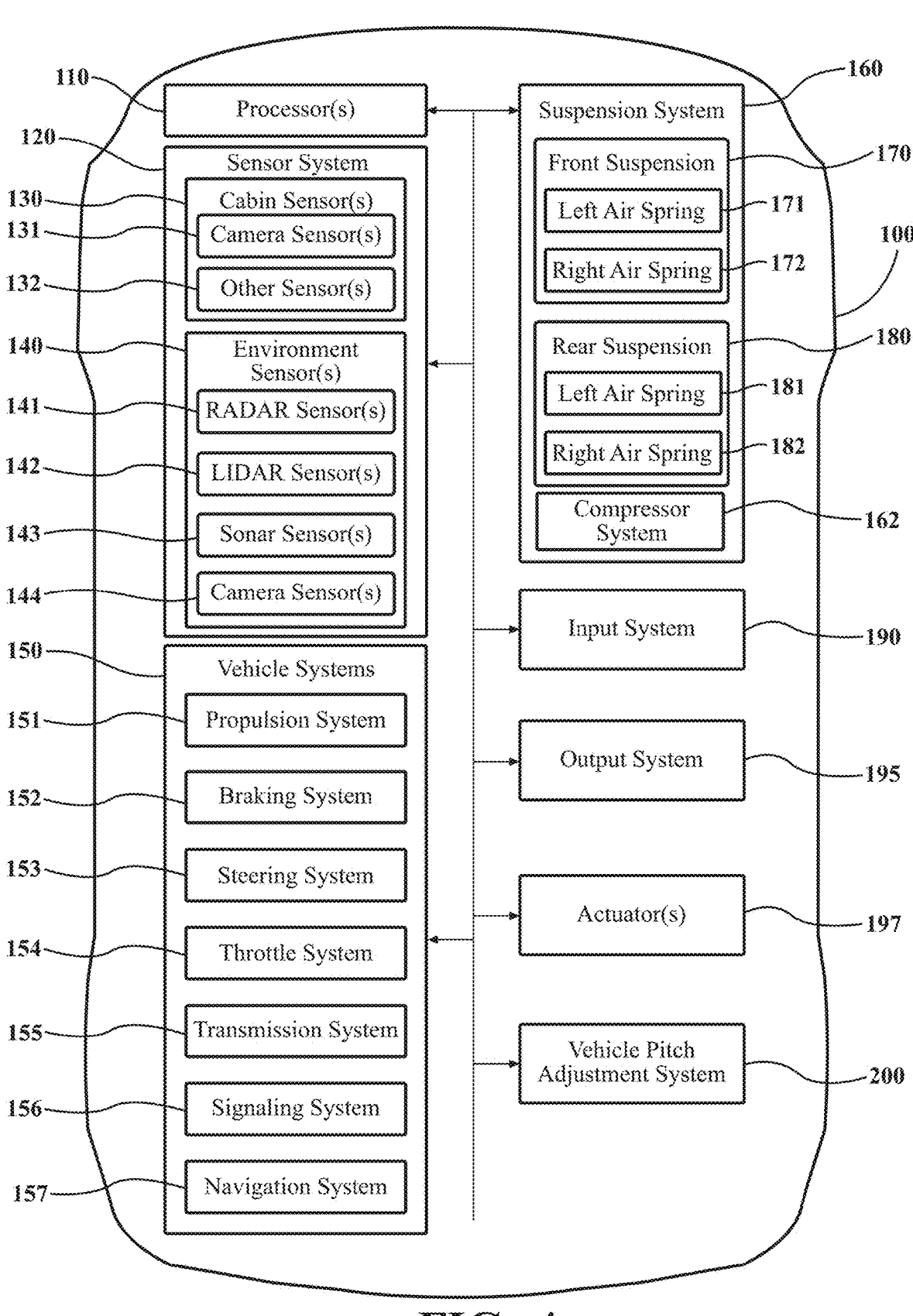
FIG. 4 illustrates a vehicle incorporating a vehicle pitch adjustment system that improves driver visibility by adjusting the pitch of the vehicle.

Referring to FIG. 4, an example of the vehicle 100 incorporating the vehicle pitch adjustment system 200 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

The vehicle 100 also includes various elements. It will be understood that in various embodiments it may not be necessary for the vehicle 100 to have all of the elements shown in FIG. 4. The vehicle 100 can have any combination of the various elements shown in FIG. 4. Further, the vehicle 100 can have additional elements to those shown in FIG. 4. In some arrangements, the vehicle 100 may be implemented without one or more of the elements shown in FIG. 4. While the various elements are shown as being located within the vehicle 100 in FIG. 4, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 4 and will be described along with subsequent figures. However, a description of many of the elements in FIG. 4 will be provided after the discussion of FIGS. 5 and 6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes the vehicle pitch adjustment system 200. As explained briefly before, the vehicle pitch adjustment system 200 can change the pitch of the vehicle 100 by controlling a suspension system 160. In this example, the suspension system 160 includes a front suspension 170 and a rear suspension 180. The front suspension 170 and/or the rear suspension 180 utilize an air suspension system that includes front left/right air springs 171 and 172 and rear left right/air springs 181 and 182 that can be inflated/deflated to change the overall ride height of the vehicle 100 and therefore the pitch of the vehicle 100. However, it should be understood that the suspension system 160 can use any one of a number of different technologies for adjusting the pitch of the vehicle 100 and is not just limited to air suspension systems.

In this example, the suspension system 160 also includes a compressor system 162 that can selectively change the amount of air provided to the front left/right air springs 171 and 172 and/or the rear left right/air springs 181 and 182. The compressor system 162 may include an electronic air compressor and/or a compressed air storage tank as well as the necessary plumbing arranged to selectively increase/reduce air provided to the front left/right air springs 171 and 172 and/or the rear left right/air springs 181 and 182. In one example, by providing more air to the rear left right/air springs 181 and 182 than the front left/right air springs 171 and 172, the rear end 106 of the vehicle 100 may be raised. Conversely, by providing more air to the front left/right air springs 171 and 172 than the rear left right/air springs 181 and 182, the front end 104 of the vehicle 100 may be raised.

The vehicle 100 may also include a sensor system 120 that can include cabin sensor(s) 130 and environment sensor(s) 140. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In this example, the cabin sensor(s) 130 are able to sense objects, such as the driver 12 or other occupants, located within the vehicle 100. The cabin sensor(s) 130 may include camera sensor(s) 131, but may also include other sensor(s) 132 that can assist with monitoring the cabin of the vehicle 100. For example, the other sensor(s) 132 can include radar, sonar, LIDAR, biometric, Doppler, and the like.

As such, the cabin sensor(s) 130 may be able to detect information related to the driver 12, such as one or more physical characteristics of the driver 12. For example, using sensor information from the cabin sensor(s) 130, the physical characteristics of the driver 12 can be derived or otherwise computed, including the height of the driver 12, the position of the head 18 of the driver 12, the position of the eyes 20 of the driver 12, the field of view of the driver 12, the seating position of the driver 12, and/or other physical characteristics of the driver 12.

As to the environment sensor(s) 140, the environment sensor(s) 140 can include one or more radar sensor(s) 141, one or more LIDAR sensor(s) 142, one or more sonar sensor(s) 143, and/or one or more camera sensor(s) 144. In one or more arrangements, the one or more camera sensor(s) 144 can be high dynamic range (HDR) cameras or infrared (IR) cameras. Generally, the environment sensors(s) 140 can detect objects located outside the vehicle 100, such as elevated objects or low objects that are close to the ground.

Figure 5:
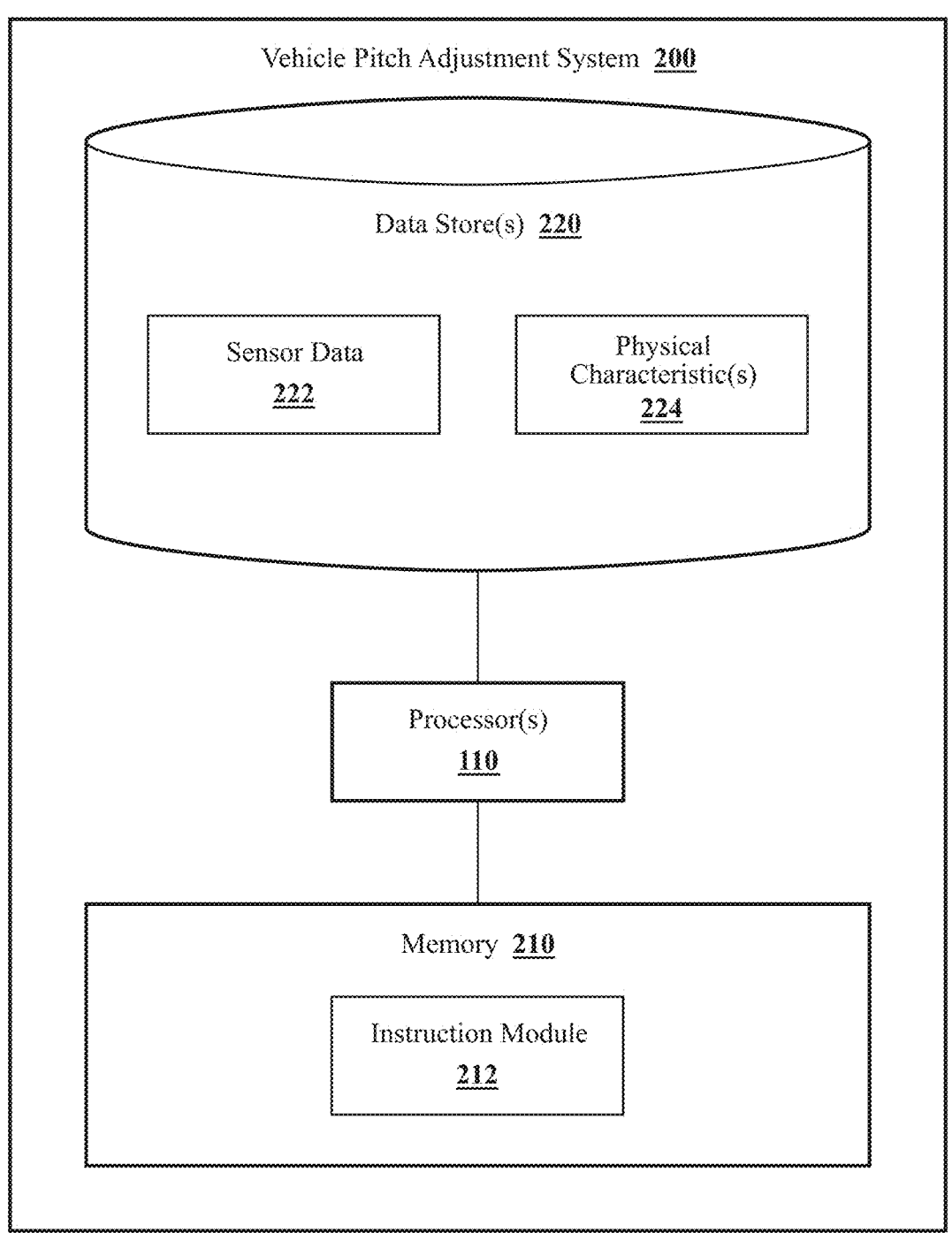
FIG. 5 illustrates a more detailed view of the vehicle pitch adjustment system of FIG. 4.
Figure 6:
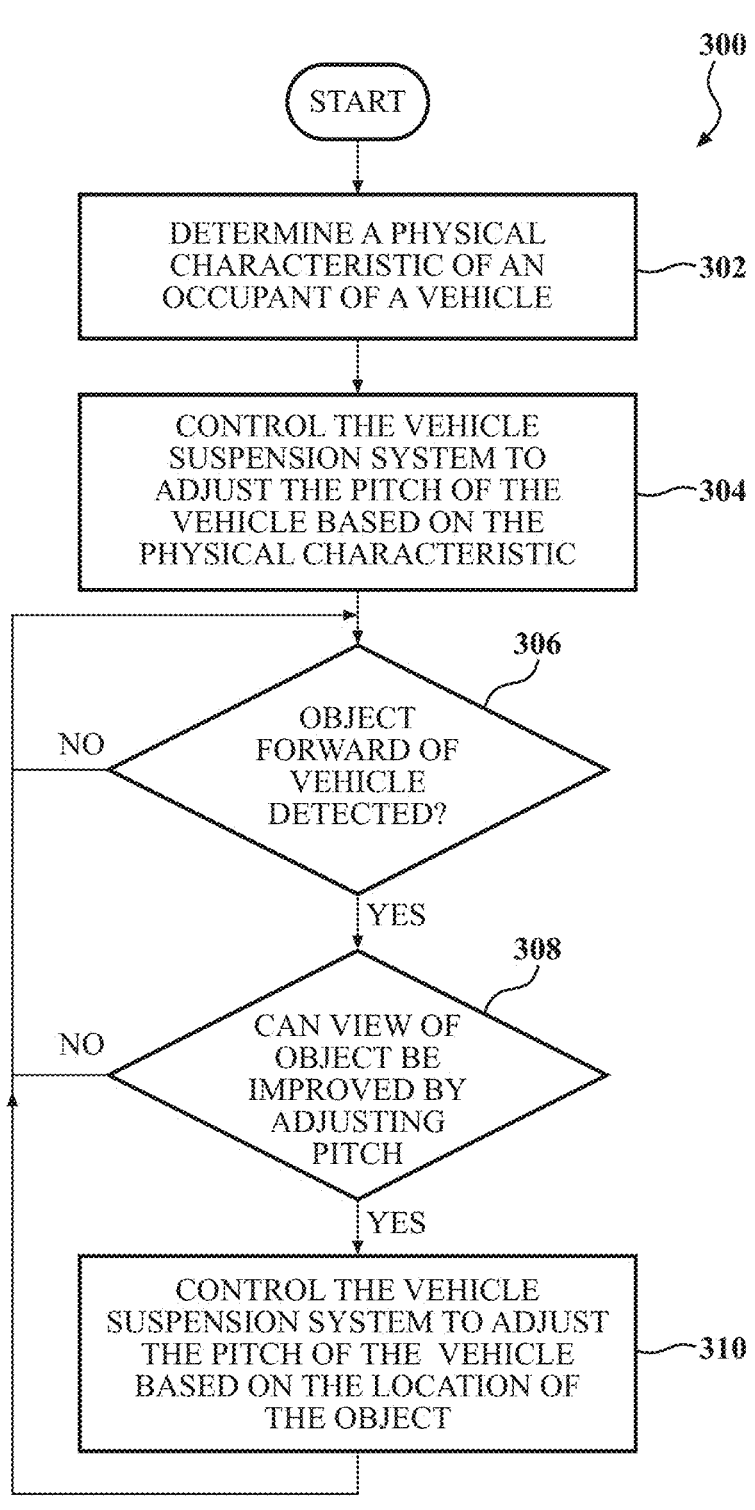
FIG. 6 illustrates a method for adjusting the pitch of the vehicle based on a physical characteristic of the driver of the vehicle to improve driver visibility.

With reference to FIG. 5, one embodiment of the vehicle pitch adjustment system 200 is further illustrated. As shown, the vehicle pitch adjustment system 200 includes one or more processor(s) 110. Accordingly, the processor(s) 110 may be a part of the vehicle pitch adjustment system 200 or the vehicle pitch adjustment system 200 may access the processor(s) 110 through a data bus or another communication path. In one or more embodiments, the processor(s) 110 is an application-specific integrated circuit that is configured to implement functions associated with an instruction module 212. In general, the processor(s) 110 is an electronic processor, such as a microprocessor, which is capable of performing various functions as described herein. In one embodiment, the vehicle pitch adjustment system 200 includes a memory 210 that stores the instruction module 212. The memory 210 is a random-access memory (RAM), read-only memory (ROM), a hard disk drive, a flash memory, or other suitable memory for storing the instruction module 212. The instruction module 212 is, for example, computer-readable instructions that, when executed by the processor(s) 110, cause the processor(s) 110 to perform the various functions disclosed herein.

Furthermore, in one embodiment, the vehicle pitch adjustment system 200 includes one or more data store(s) 220. The data store(s) 220 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store(s) 220 stores data used by the instruction module 212 in executing various functions.

In one embodiment, the data store(s) 220 may store the sensor data 222 generated by the sensor system 120 and/or one or more physical characteristic(s) 224 of the driver or another occupant of the vehicle 100. As to the sensor data 222, the sensor data 222 may include sensor data generated by the cabin sensor(s) 130 and/or environment sensor(s) 140. As such, in one example, the sensor data 222 may include sensor data that may help determine the physical characteristic(s) 224 of the driver of the vehicle 100. In addition, the sensor data 222 may also include sensor data that may be utilized to help determine the locations of objects external to the vehicle 100, such as low objects or elevated objects.

The physical characteristic(s) 224 stored within the data store(s) 220, as mentioned earlier, may include one or more physical characteristic(s) 224 of the driver 12 or another occupant of the vehicle 100. A description of what encompasses the physical characteristic(s) 224 and how the physical characteristic(s) 224 are determined will be provided below.

As mentioned before, the instruction module 212 includes instructions that, when executed by the processor(s) 110, cause the processor to perform any of the functions described herein. In one example, the instruction module 212 includes instructions that cause the processor(s) 110 to determine one or more physical characteristic(s) 224 of an occupant, such as the driver 12, of the vehicle 100. In one example, the processor(s) 110 may receive information that can be utilized to determine the physical characteristic(s) 224 of the occupant of the vehicle 100 from a variety of different sources. In some cases, the sources may be sensor information collected from the sensor system 120.

As such, in one example, the cabin sensor(s) 130 of the vehicle 100 may collect information regarding the seating position of the driver 12, position of the head 18 of the driver 12, overall height of the driver 12, position of the eyes 20 of the driver 12, field of view of the driver 12, amongst other things. Additionally or alternatively, the environment sensor(s) 140 may also be able to collect and provide information that can be utilized to determine the physical characteristic(s) 224 of the occupant of the vehicle 100. For example, images from the camera sensor(s) 144 can be used to determine the overall height of the driver 12 when the driver 12 is walking and/or standing outside the vehicle 100.

In addition to or in the alternative, the physical characteristic(s) 224 may also be determined or otherwise known by driver 12 and/or occupant, who can then input this information into the vehicle pitch adjustment system 200. For example, the driver of the vehicle 100 may utilize the input system 190 of the vehicle 100 to provide physical characteristics of the driver 12 or occupant, such as the height of the driver 12, the general seating position of the driver 12, etc.

The physical characteristic(s) 224 may also be determined by combining multiple variables mentioned above with information specific to the vehicle 100. For example, the physical characteristic(s) 224 may include the height of the driver 12 but may also be combined with seat position information, such as how high/low the driver 12 has adjusted their seat to determine and/or adjust any of the physical characteristic(s) 224, including the position of the head 18 and/or position of the eyes 20 of the driver 12.

Once the physical characteristic(s) 224 of the driver 12 have been determined, the instruction module 212 includes instructions that, when executed by the processor(s) 110, cause the processor(s) 110 to control the suspension system 160 of the vehicle 100 to adjust the pitch 13 of the vehicle 100 based on the physical characteristic(s) 224 of the driver 12 to improve the overall visibility for the driver 12. As mentioned before, the vehicle 100 has a front suspension 170 that includes air springs 171 and 172 and a rear suspension 180 that includes air springs 181 and 182. In addition, the suspension system 160 includes a compressor system 162 that can be controlled by the processor(s) 110 to adjust the amount of air in the air springs 171, 172, 181, and/or 182 to change the pitch 13 of the vehicle 100.

For example, as illustrated in FIG. 2B, the processor(s) 110 may increase the amount of air in the air springs 181 and 182 of the rear suspension 180 and/or decrease the amount of air in the air springs 171 and 172 of the front suspension 170 to essentially raise the rear end 106 and/or lower the front end 104 of the vehicle 100. By adjusting the suspension system 160 as shown, the processor(s) 110 has increased the visibility of a low object 30 that is closer to the ground 11 to the driver 12. Conversely, the opposite may occur, wherein the processor(s) 110 may decrease the amount of air in the air springs 181 and 182 of the rear suspension 180 and/or increase the amount of air in the air springs 171 and 172 of the front suspension 170 to essentially lower the rear end 106 and raise the front end 104 of the vehicle 100 to improve the visibility of elevated objects, such as shown in FIG. 3B.

Additionally or in the alternative, the instruction module 212 includes instructions that, when executed by the processor(s) 110, cause the processor(s) 110 to control the suspension system 160 of the vehicle 100 to adjust the pitch 13 of the vehicle 100 based on the location of an object that is external to the vehicle 100 to improve the overall visibility of the object to the driver. As such, the instruction module 212 includes instructions that, when executed by the processor(s) 110, cause the processor(s) 110 to first determine the location of an object forward of the vehicle 100 by utilizing information collected from the environment sensor(s) 140. Once an object forward of the vehicle 100 is detected, the instruction module 212 includes instructions that, when executed by the processor(s) 110, cause the processor(s) 110 to determine if the object is visible to the driver 12 of the vehicle 100 based on the physical characteristic(s) 224 of the driver.

If the object is not visible to the driver 12, the instruction module 212 includes instructions that, when executed by the processor(s) 110, cause the processor(s) 110 to control the suspension system 160 of the vehicle 100 to adjust the pitch 13 of the vehicle 100 based on the location of the object to improve the overall visibility of the object to the driver 12. Like before, this can involve lowering or raising the front end 104 and/or the rear end 106 of the vehicle 100 by appropriately adjusting the amount of air in the air springs 171, 172, 181, and/or 182. Optionally, when the object is no longer present, the instruction module 212 may include instructions that, when executed by the processor(s) 110, cause the processor(s) 110 to control the suspension system 160 of the vehicle 100 to adjust the pitch 13 to a prior state before the object was detected.

Referring to FIG. 5, a method 300 for adjusting the pitch of the vehicle 100 to improve visibility is shown. The method 300 will be described from the viewpoint of the vehicle 100 in FIG. 3 and the vehicle pitch adjustment system 200 in FIG. 4. However, it should be understood that this is just one example of implementing the method 300. While method 300 is discussed in combination with the vehicle pitch adjustment system 200, it should be appreciated that the method 300 is not limited to being implemented within the vehicle pitch adjustment system 200, but is instead one example of a system that may implement the method 300.

In step 302, the instruction module 212 includes instructions that, when executed by the processor(s) 110, cause the processor(s) 110 to determine one or more physical characteristic(s) 224 of an occupant, such as the driver 12, of the vehicle 100. As mentioned before, the processor(s) 110 may receive information that can be utilized to determine the physical characteristic(s) 224 of the occupant of the vehicle 100 from a variety of different sources, such as information collected from the sensor system 120 and/or information provided by the driver 12 to the input system 190 of the vehicle 100. The physical characteristic(s) 224 can include any number of things, including the seating position of the driver 12, position of the head 18 of the driver 12, the height of the driver 12, position of the eyes 20 of the driver 12, field of view of the driver 12, etc.

In step 304, the instruction module 212 includes instructions that, when executed by the processor(s) 110, cause the processor(s) 110 to control the suspension system 160 of the vehicle 100 to adjust the pitch 13 of the vehicle 100 based on the physical characteristic(s) 224 of the driver 12 to improve the overall visibility for the driver 12. As mentioned, this may be achieved by adjusting the amount of air adjusting the amount of air in the air springs 171, 172, 181, and/or 182 to raise and/or lower the front end 104 and/or the rear end 106 of the vehicle 100.

Additionally or in the alternative, the method 300 may also include steps that consider the location of an object that is forward of the vehicle 100. In this case, in step 306, the instruction module 212 includes instructions that, when executed by the processor(s) 110, cause the processor(s) 110 to determine the presence of an object forward of the vehicle 100. This may be accomplished by utilizing information generated by the environment sensor(s) 140. If no object is detected, the method 300 may continue monitoring for the presence of an object forward of the vehicle 100.

However, if an object is detected forward of the vehicle 100, the method 300 proceeds to step 308, wherein the instructions, when executed by the processor(s) 110, cause the processor(s) 110 to determine if the view of the object to the driver 12 can be improved by adjusting the pitch 13 of the vehicle 100. If the view of the object to the driver 12 cannot be improved, the method 300 may return to step 306. Otherwise, the method 300 proceeds to step 310, wherein the instructions, when executed by the processor(s) 110, cause the processor(s) 110 to control the suspension system 160 of the vehicle 100 to adjust the pitch 13 of the vehicle 100 based on the location of the detected object. Again, this may be achieved by adjusting the amount of air adjusting the amount of air in the air springs 171, 172, 181, and/or 182 to raise and/or lower the front end 104 and/or the rear end 106 of the vehicle 100.

After step 310 has concluded, the method 300 may end, return to step 306, and/or perform other operations, such as causing the processor(s) 110 to control the suspension system 160 of the vehicle 100 to adjust the pitch 13 to a prior state before the object was detected in step 306.

FIG. 4 will now be discussed in full detail as an example environment within which the system and methods disclosed herein may operate. As mentioned previously, the driver 12 may provide their physical characteristics via the input system 190. The "input system" includes any device, component, system, element, arrangement or groups thereof that enable information/data to be entered into a machine. The input system 190 can receive an input from a vehicle passenger (e.g., a driver or a passenger). The vehicle 100 can include an output system 195. An "output system" includes any device, component, arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 4. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 151, a braking system 152, a steering system 153, a throttle system 154, a transmission system 155, a signaling system 156, and/or a navigation system 157. Each of these systems can include one or more devices, components, and/or a combination thereof, now known or later developed.

The navigation system 157 can include one or more devices, applications, and/or combinations thereof, now known or later developed, configured to determine the geographic location of the vehicle 100 and/or to determine a travel route for the vehicle 100. The navigation system 157 can include one or more mapping applications to determine a travel route for the vehicle 100. The navigation system 157 can include a global positioning system, a local positioning system, or a geolocation system.

The vehicle 100 can include one or more actuators 197. The actuators 197 can be any element or combination of elements operable to modify, adjust, and/or alter one or more of the vehicle systems 150 or components thereof to responsive to receiving signals or other inputs from the processor(s) 110. Any suitable actuator can be used. For instance, the one or more actuators 197 can include motors, pneumatic actuators, hydraulic pistons, relays, solenoids, and/or piezoelectric actuators, to name a few possibilities.

The vehicle 100 can include one or more modules, at least some of which are described herein. The modules can be implemented as computer-readable program code that, when executed by a processor(s) 110, implements one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system disposed within a vehicle comprising:
a processor; and
a memory in communication with the processor, the memory having instructions that, when executed by the processor, cause the processor to:
determine a physical characteristic of an occupant of a vehicle, and
control a vehicle suspension system to adjust a pitch of the vehicle based on the physical characteristic and a location of an object that is forward of the vehicle.

2. The system of claim 1, wherein the physical characteristic includes a height of the occupant, a seating position of the occupant, an occupant facial position when the occupant is seated within the vehicle, and an occupant field of view when the occupant is seated within the vehicle.

3. The system of claim 1, wherein the memory further includes instructions that, when executed by the processor, cause the processor to determine the physical characteristic of the occupant using at least one of vehicle cabin sensor data and an input from the occupant.

4. The system of claim 1, wherein the memory further includes instructions that, when executed by the processor, cause the processor to lower a front end of the vehicle by controlling a front suspension and raise a rear end of the vehicle by controlling a rear suspension.

5. The system of claim 1, wherein the memory further includes instructions that, when executed by the processor, cause the processor to raise a front end of the vehicle by controlling a front suspension and lower a rear end of the vehicle by controlling a rear suspension.

6. The system of claim 1, wherein the occupant is a driver of the vehicle.

7. A method comprising:
determining a physical characteristic of an occupant of a vehicle, and
controlling a vehicle suspension system to adjust a pitch of the vehicle based on the physical characteristic and a location of an object that is forward of the vehicle.

8. The method of claim 7, wherein the physical characteristic includes a height of the occupant, a seating position of the occupant, an occupant facial position when the occupant is seated within the vehicle, and an occupant field of view when the occupant is seated within the vehicle.

9. The method of claim 7, further comprising determining the physical characteristic of the occupant using at least one of vehicle cabin sensor data and an input from the occupant.

10. The method of claim 7, further comprising:
lowering a front end of the vehicle by controlling a front suspension; and
raising a rear end of the vehicle by controlling a rear suspension.

11. The method of claim 7, further comprising:
raising a front end of the vehicle by controlling a front suspension; and
lowering a rear end of the vehicle by controlling a rear suspension.

12. The method of claim 7, wherein the occupant is a driver of the vehicle.

13. A non-transitory computer-readable medium storing instructions that, when executed by a processor, cause the processor to:
determine a physical characteristic of an occupant of a vehicle, and
control a vehicle suspension system to adjust a pitch of the vehicle based on the physical characteristic and a location of an object that is forward of the vehicle.

14. The non-transitory computer-readable medium of claim 13, wherein the physical characteristic includes a height of the occupant, a seating position of the occupant, an occupant facial position when the occupant is seated within the vehicle, an occupant field of view when the occupant is seated within the vehicle.

15. The non-transitory computer-readable medium of claim 13, further comprising instructions that, when executed by the processor, cause the processor to determine the physical characteristic of the occupant using at least one of vehicle cabin sensor data and an input from the occupant.

16. The non-transitory computer-readable medium of claim 13, further comprising instructions that, when executed by the processor, cause the processor to lower a front end of the vehicle by controlling a front suspension and raise a rear end of the vehicle by controlling a rear suspension.

17. The non-transitory computer-readable medium of claim 13, further comprising instructions that, when executed by the processor, cause the processor to raise a front end of the vehicle by controlling a front suspension and lower a rear end of the vehicle by controlling a rear suspension.

* * * * *